United States Patent
Bone et al.

(10) Patent No.: US 10,700,854 B2
(45) Date of Patent: Jun. 30, 2020

(54) RESOURCE MANAGEMENT IN A CELLULAR NETWORK

(71) Applicant: VODAFONE IP LICENSING LIMITED, London (GB)

(72) Inventors: Nicholas Bone, London (GB); Stephen Babbage, London (GB); Aguibou Barry, London (GB)

(73) Assignee: VODAFONE IP LICENSING LIMITED, Paddington, London (GB)

( * ) Notice: Subject to any disclaimer, the term of this patent is extended or adjusted under 35 U.S.C. 154(b) by 0 days.

(21) Appl. No.: 15/314,906

(22) PCT Filed: May 29, 2015

(86) PCT No.: PCT/EP2015/061973
§ 371 (c)(1),
(2) Date: Nov. 29, 2016

(87) PCT Pub. No.: WO2015/181359
PCT Pub. Date: Dec. 3, 2015

(65) Prior Publication Data
US 2018/0205542 A1    Jul. 19, 2018

(30) Foreign Application Priority Data
May 30, 2014   (GB) .................................. 1409635.8

(51) Int. Cl.
*H04L 9/06*   (2006.01)
*H04L 9/08*   (2006.01)
*H04W 12/04*  (2009.01)
*H04W 12/00*  (2009.01)
*H04L 9/32*   (2006.01)
(Continued)

(52) U.S. Cl.
CPC .......... *H04L 9/0841* (2013.01); *H04L 9/0897* (2013.01); *H04L 9/3228* (2013.01); *H04L 63/12* (2013.01); *H04L 67/141* (2013.01); *H04W 8/18* (2013.01); *H04W 12/0023* (2019.01); *H04W 12/04* (2013.01); *H04W 48/18* (2013.01)

(58) Field of Classification Search
CPC ... H04L 9/0841; H04L 9/0897; H04L 9/3228; H04L 63/12; H04L 67/141; H04W 8/18; H04W 12/04; H04W 48/18
USPC ......................................................... 713/171
See application file for complete search history.

(56) References Cited

U.S. PATENT DOCUMENTS 5,793,866 A * 8/1998 Brown ................ H04L 63/1408
                                                         380/2
6,260,147 B1 * 7/2001 Quick, Jr. ............. H04L 9/0844
                                                         713/164
(Continued)

OTHER PUBLICATIONS

International Search Report for PCT/EP2015/061973 dated Jul. 30, 2015.

*Primary Examiner* — Shahriar Zarrineh
(74) *Attorney, Agent, or Firm* — Workman Nydegger

(57) ABSTRACT

Method, system and apparatus for provisioning a subscription of a service to a device comprising: receiving a message from a device, the message protected by first provisioning data installed on the device. Authenticating the message using data corresponding to the first provisioning data. On successful authentication, providing data enabling the device to recover protected second provisioning data from a subscription manager. Providing the device with the protected second provisioning data.

16 Claims, 4 Drawing Sheets

(51) Int. Cl.
*H04L 29/06* (2006.01)
*H04L 29/08* (2006.01)
*H04W 8/18* (2009.01)
*H04W 48/18* (2009.01)

(56) References Cited

U.S. PATENT DOCUMENTS

| | | | |
|---|---|---|---|
| 6,611,913 B1 | 8/2003 | Carroll et al. | |
| 7,139,556 B2* | 11/2006 | Marley | H04L 63/0421 455/414.1 |
| 7,418,596 B1* | 8/2008 | Carroll | H04L 63/068 380/247 |
| 7,562,129 B1* | 7/2009 | Lee | H04L 67/306 709/219 |
| 7,987,365 B2* | 7/2011 | Birrell | G06F 21/121 713/168 |
| 8,364,951 B2* | 1/2013 | Peterka | H04L 63/062 380/279 |
| 8,863,256 B1* | 10/2014 | Addepalli | H04W 4/046 726/7 |
| 8,881,256 B1* | 11/2014 | Roth | G06F 21/123 726/9 |
| 8,966,262 B2* | 2/2015 | Schell | H04L 63/0853 713/169 |
| 9,032,473 B2* | 5/2015 | Guccione | H04L 63/102 726/1 |
| 2002/0018569 A1 | 2/2002 | Panjwani et al. | |
| 2003/0131075 A1* | 7/2003 | Bear | H04L 41/5054 709/219 |
| 2004/0042509 A1* | 3/2004 | Gallant | H04J 3/12 370/522 |
| 2004/0192254 A1* | 9/2004 | Choi | H04W 48/18 455/411 |
| 2005/0152343 A1* | 7/2005 | Rajagopalan | H04M 7/0069 370/352 |
| 2005/0166051 A1 | 7/2005 | Buer | |
| 2006/0015617 A1* | 1/2006 | Castro | H04L 41/022 709/226 |
| 2006/0235963 A1* | 10/2006 | Wetherly | H04L 12/1859 709/224 |
| 2007/0101351 A1* | 5/2007 | Bagsby | G06Q 30/0613 725/1 |
| 2007/0224970 A1* | 9/2007 | Bang | H04L 63/08 455/411 |
| 2007/0249323 A1* | 10/2007 | Lee | G06F 21/33 455/411 |
| 2008/0096550 A1* | 4/2008 | Mandelin | H04W 8/26 455/425 |
| 2009/0069003 A1* | 3/2009 | Kim | H04W 28/06 455/422.1 |
| 2010/0071053 A1* | 3/2010 | Ansari | G06Q 30/04 726/12 |
| 2011/0016321 A1 | 1/2011 | Sundaram et al. | |
| 2011/0022680 A1* | 1/2011 | Johnson | G06F 16/958 709/217 |
| 2011/0096929 A1* | 4/2011 | Seleznev | H04L 63/068 380/273 |
| 2012/0278869 A1* | 11/2012 | Guccione | H04L 63/102 726/5 |
| 2013/0007853 A1* | 1/2013 | Gupta | H04W 76/10 726/5 |
| 2013/0077534 A1* | 3/2013 | Hu | H04L 41/5054 370/259 |
| 2013/0089025 A1* | 4/2013 | Titcombe | H04Q 3/0045 370/328 |
| 2013/0127673 A1* | 5/2013 | Chang | H01Q 1/24 343/702 |
| 2013/0132854 A1* | 5/2013 | Raleigh | G06F 3/0482 715/738 |
| 2013/0185560 A1* | 7/2013 | Eld | H04L 9/12 713/168 |
| 2013/0210484 A1* | 8/2013 | Jeenagala | H04W 88/06 455/552.1 |
| 2013/0232561 A1* | 9/2013 | Gupta | H04W 8/18 726/5 |
| 2013/0237197 A1* | 9/2013 | Ruvalcaba | H04W 8/183 455/418 |
| 2013/0276076 A1* | 10/2013 | Gupta | H04W 12/06 726/5 |
| 2013/0305330 A1* | 11/2013 | Palanigounder | H04L 63/062 726/6 |
| 2014/0011541 A1* | 1/2014 | Cormier | H04W 8/183 455/558 |
| 2014/0047562 A1* | 2/2014 | Stepanov | H04N 21/2668 726/29 |
| 2014/0059694 A1* | 2/2014 | Lortz | G06F 21/60 726/26 |
| 2014/0075023 A1* | 3/2014 | Holtmanns | H04W 8/18 709/224 |
| 2014/0087691 A1 | 3/2014 | Babbage et al. | |
| 2014/0237101 A1* | 8/2014 | Park | H04W 4/50 709/223 |
| 2014/0370892 A1* | 12/2014 | Gottimukkala | H04W 60/005 455/435.1 |
| 2015/0074259 A1* | 3/2015 | Ansari | H04L 67/02 709/224 |
| 2015/0089614 A1* | 3/2015 | Mathew | H04L 67/141 726/7 |
| 2015/0094022 A1* | 4/2015 | Cohen | H04W 4/24 455/411 |
| 2015/0110044 A1* | 4/2015 | Berzin | H04W 28/0252 370/329 |
| 2015/0180978 A1* | 6/2015 | Canpolat | H04L 5/0092 370/329 |
| 2015/0349825 A1* | 12/2015 | Lee | H04W 8/205 455/558 |
| 2016/0157098 A1* | 6/2016 | Gupta | H04W 12/04031 726/6 |

\* cited by examiner

RESOURCE MANAGEMENT IN A CELLULAR NETWORK

CROSS REFERENCE TO RELATED APPLICATIONS

This application is a U.S. Nationalization of PCT Application Number PCT/EP2015/061973, filed on May 29, 2015, which claims priority to GB Patent Application No. 1409635.8 filed on May 30, 2014, the entireties of which are incorporated herein by reference.

FIELD OF THE INVENTION

The present invention relates to a method, apparatus and system for provisioning a subscription of a service to a device and in particular but not limited to a machine to machine device operating within a cellular network.

BACKGROUND OF THE INVENTION

In a cellular or other network, some methods for a device to access services require the device to have a subscriber identity, typically encoded within a secure environment such as a UICC, SIM or embedded SIM, for example. The subscriber identity may be given provisioning data (usually in the form of cryptographic material), which allows the device to subscribe to one or more services. Subscription may involve the addition of the subscriber identity to a subscriber profile repository or subscriber list held by a subscription manager. The addition of the subscriber identity to such a repository can be dependent on the device presenting suitable provisioning data, which may be checked and validated. Providing the device (or the UICC, SIM or embedded SIM) with these provisioning data is known as provisioning the subscription of a service.

Existing SIM cards (UICC) may be personalised individually with unique keys and identifiers at a secure personalisation centre. This may be operated by a SIM vendor or manufacturer like Gemalto or Giesecke and Devrient.

The SIM cards are then distributed from that centre either to operator warehouses, or increasingly in the case of machine to machine (M2M) devices, directly to a modem or whole device manufacturer (OEM) for integration as a component part. The OEM then has to personalise the rest of the device e.g. with a flash image, unique device ID, MAC address and possibly other keys.

This process has several problems:
Each unique personalization step adds costs;
There is a "detour" from the original chip maker (a party like Infineon or NXP) via the SIM personalization centre before the UICC is shipped to the OEM;
The UICC is constrained in terms of form factor: e.g. it must be a dedicated "chip" with its own packaging, defined contacts and size. This can create some issues in terms of size of M2M equipment, and durability of the UICC in a long-lived device or in a difficult environment (SIM card may be shaken lose, contacts may overheat, freeze, become too moist etc.) While specially packaged UICCs exist (machine form factor), these are more expensive than conventional SIM card form factors, and so are harder to apply to low cost devices.
With a reduction in device cost the SIM can become a disproportionate share of the total device cost.

Many types of devices may be granted access to a mobile network as long as the network access credentials (also known as AKA credentials) are valid. These credentials need to be stored in a "secure execution environment" (typically a SIM card) to prevent tampering and cloning.

However, if a mobile operator's subscription key is negotiated remotely, for example via a Diffie-Hellman key exchange, rather than loaded at manufacture of the device, then it can be difficult for the mobile operator to determine whether the resulting key is being stored in a Secure Execution Environment (like a SIM card) since authentication of the device may not be possible. These concerns are sufficiently serious to rule out an "anonymous" Diffie-Hellman approach.

One way to ensure provisioning of AKA credentials to the right target requires the device being equipped with identities that cannot be usurped. It is therefore important that each device is equipped with unique identification, and that there is an assurance that this unique identification cannot be modified without strong authorization.

If asymmetric cryptography is chosen then each device must be provisioned with a unique public-private key pair.

Some entity must therefore take responsibility and some liability for the security of the device. This "liable representative" may provide a trust anchor to any entity such as the mobile network operator (MNO) that needs to verify the identity of the device.

The Machine Form Factor SIM (MFF1, MFF2) addresses some of the form factor issues, but does not address the cost and logistic issues. Furthermore, it is more expensive than typical SIM card form factor.

In 2008, Oberthur and Wavecom (later acquired by Sierra Wireless) proposed a solution called "inSIM" which would allow the SIM card to be placed inside another chip package (the baseband processor). However, the solution did not meet operator security requirements, as the operator credentials would need to be provisioned to the "inSIM" at an insecure location (OEM production line).

Recent approaches to embedded SIM (eUICC standardization efforts in GSMA and ETSI SCP, Vodafone SOBE project) allow an operator subscription to be updated remotely on the UICC. However, these approaches still require unique initial secrets to be loaded to each UICC, so do not avoid the need for a smart card personalization centre.

Further, the UICC needs to be loaded with an initial IMSI/Ki and profile (a so-called "provisioning subscription") in order to connect to a mobile network and download a permanent subscription.

U.S. Pat. No. 8,589,689 describes over-the-air provisioning of authentication credentials at an access device via a first access system (e.g. CDMA), wherein the authentication credentials are for a second access system (e.g. 3GPP) lacking an over-the-air provisioning procedure. Whilst, this enables access to a mobile network, it doesn't allow devices to be provisioned by external entities in a secure manner.

Furthermore, a motivation for the use of smart cards as "Secure Execution Environments" is to avoid problems with untrusted (or rogue) subscribers. However, M2M will often use trusted business partners of a network operator as subscribers, or otherwise use large businesses with a reputation to protect. Such organisations are not likely to deliberately violate terms of service (via cloning etc.), or run up big bills without paying. A business partner may offer (or wish to use) an alternative to a smart card as a way of storing an operator's subscription key (K), either on the grounds of cost, or size, or durability.

In this case, the partner may be confident enough to accept the liability for bills in the case of a leak/clone of the subscription credentials.

Note that even with trusted business relationships, one particular challenge to consider that devices may go through distribution channels which aren't entirely trusted. If key material loaded at device manufacture is not sufficiently protected, then an individual, such as a shop assistant (for instance), could extract it and use it to discover the final key material.

In some M2M scenarios, a technician needs to configure the device prior to activating it for operations. A known solution would be to provide a batch of SIM cards to the technician to insert into the devices.

However, there is considerable complexity and risk of carrying a plurality of SIM cards. If the technician has to take them to an external or insecure environment such as a public place, then a thief could attempt to steal from the plurality or stack of SIM cards. If the theft remains unnoticed for several days, then it may have repercussions. The SIM card may be used in an unintended device, incur data and/or voice charges at the M2M customer's expense, or provide faulty information (e.g. false location information to a vehicle tracking service). Additionally, the technician might himself be a thief, or co-operating with the thief.

There is also the risk that the technician does something wrong when configuring the device and in particular when activating the subscription and "binding" it to a particular device. This could either be a human error or attempt to tamper with the credentials used to set up the network access credentials. There is a particular risk of error if the IMSI-IMEI binding was set up before insertion of the SIM card, since the technician might accidentally insert the SIM card in the wrong device. Or even if the binding is set up during or after activation (via a portal) then the SIM card might now be bound to the wrong device.

For technician provisioning, one direct countermeasure to the risks could be for any SIM card to be activated only after being inserted in the target device. The authorization of the activation may be a combination of things, e.g. the technician being authenticated to a Device Management (DM) portal, the SIM being authenticated by the mobile network, the device being authenticated by the DM portal, the device having successfully reported which SIM is currently inserted in it.

A further countermeasure could be to limit what the SIM can do when activated, e.g. it may be prohibited from making voice calls, or is only allowed to transmit small amounts of data, or only allowed to transmit to designated addresses (M2M servers) rather than the wider Internet.

Another useful countermeasure could be "binding" an IMSI (SIM identifier) to an IMEI (device identifier). This may ensure that a SIM can only be used within a target device. For example, if the SIM is placed in a different device, then the alternate IMEI is reported to the mobile network's HLR, which detects that it is not the intended device. That can lead to barring or temporarily suspending the subscription. A more complicated solution (but one that may protect against a faked IMEI) is a secure channel between the SIM card and the target device.

Cost reasons are a major driver in M2M. Security requirements may be beyond the above solutions or potential solutions and may also increase costs and decrease flexibility. Cheaper solutions to conventional SIM cards having full flexibility across a whole range of low-cost devices are also desirable.

Therefore, there are required a method, system and apparatus that overcomes these problems.

SUMMARY OF THE INVENTION

In accordance with a first aspect, there is provided method of provisioning a subscription of a service to a device, the method comprising the steps of:

receiving a message from a device, the message protected by first provisioning data installed on the device;

authenticating the message using data corresponding to the first provisioning data;

on successful authentication, providing data enabling the device to recover protected second provisioning data from a subscription manager; and providing the device with the protected second provisioning data. The method may operate within a wired or preferably wireless or cellular network such as a 3GPP environment, for example. This allows a silicon vendor or manufacturer to provide a secure execution environment, SEE, (e.g. UICC, SIM or other component) to a device manufacturer (e.g. a M2M device or OEM manufacturer), who can provision the SEE with device manufacturer provisioning data. The mobile operator does not have to ensure that the device manufacturer provisioning data is itself provisioned very securely, as it will not itself be used to access a service. Typically, on first power up of the new device the initial or first provisioning data may be used to obtain further or second provisioning data (e.g. a key for the device to subscribe to the required service). If the initial provisioning data is compromised then the loss can be controlled, and does not lead to the compromise of the key used to subscribe to the service. Preferably, the initial provisioning data is changed regularly by the device manufacturer and/or silicon manufacturer between device manufacturing runs to further improve security.

This method avoids a detour to a SIM card manufacturer and avoids the need for secure personalisation at an OEM.

In one embodiment, the subscription manager may be an initial or further subscription manager that does not provide the second provisioning data, but instead only provides data enabling the device to recover the protected second provisioning data from the (different) subscription manager allowing subsequent provision to the service. However, in another embodiment the same subscription manager will both authenticate the message and provide the protected second provisioning data. In one example the first provisioning data may be stored within the device or a SEE of the device in advance.

Optionally, on successful authentication, the data enabling the device to recover the protected second provisioning data may be provided to the device or to the subscription manager. For example, an initial subscription manager may provide (or "make available to") a different subscription manager the means to authenticate the device. In this example, the initial subscription manager may provide an assurance that cryptographic material within the message is associated with the device.

The initial subscription manager may create a "Device Cert" which can be used by the other subscription manager to obtain assurance about the device. This Device Cert may be provided by the initial subscription manager to the device, and then by the device to the other subscription manager. But it does not necessarily need to be sent to the device; instead, the initial subscription manager may make the Device Cert available to the other subscription manager by other means.

Optionally, the initial or further subscription manager (SM1) may be a separate component, entity, physical device, server or computer to the subscription manager (SM2).

Optionally, the further subscription manager (SM1) may receive the message from the device.

Optionally, the subscription manager (or a combined subscription manager and further subscription manager) may receive the message from the device.

Advantageously, the message may comprise a signature verification key $V_{gen}$ corresponding to a signature key $S_{gen}$ of the device. This message may also be one way of identifying the device.

Preferably, providing the device with the protected second provisioning data may further comprise the steps of:

generating Diffie-Hellman keys $Pub_{d'}$, $Priv_{d'}$ on the device;

generating Diffie-Hellman keys on the subscription manager ($Pub_{s'}$, $Priv_{s'}$);

providing the subscription manager with $Pub_{d'}$ protected by $S_{gen}$;

providing the device with $Pub_{s'}$;

generating a session key $K_{session'}$ based on $Pub_{d'}$ and $Priv_{s'}$; and sending the second provisioning data to the device protected by the session key $K_{session'}$.

Preferably, $V_{gen}$ (together with a corresponding signature key $S_{gen}$) is generated after the first provisioning data are installed on the device. However, it may be generated before the first provisioning data are installed on the device.

Optionally, the method may further comprise the step of the further subscription manager providing a message acknowledgment comprising $V_{gen}$ signed by a signature key $S_{SM1}$ of the further (initial) subscription manager.

Optionally, the method may further comprise the step of:

the further subscription manager receiving from the subscription manager or otherwise obtaining data ($V_{sm2}$) to enable the device to authenticate the subscription manager (SM2) when recovering the protected second provisioning data, and wherein the further subscription manager (SM1) provides the device with the obtained data ($V_{sm2}$). This may be through a secure connection between the two subscription managers.

Optionally, the data enabling the device to authenticate the subscription manager (SM2) is a signature verification key $V_{sm2}$ of the subscription manager. It may also be a symmetric key. This allows the device to authenticate the subscription manager.

Preferably, $V_{sm2}$ has a corresponding signature key $S_{sm2}$.

Advantageously, providing the device with the protected second provisioning data may further comprise the steps of:

generating Diffie-Hellman keys $Pub_{d'}$, $Priv_{d'}$ on the device;

generating Diffie-Hellman keys on the subscription manager ($Pub_{s'}$, $Priv_{s'}$);

providing the subscription manager with $Pub_{d'}$ protected by $S_{gen}$;

providing the device with $Pub_{s'}$ protected by $S_{sm2}$;

generating a session key $K_{session'}$ based on $Pub_{d'}$ and $Priv_{s'}$; and sending the second provisioning data to the device protected by the session key $K_{session'}$. The subscription manager does not have $Priv_{d'}$ here, and does not use $Pub_{s'}$ when generating the session key.

$V_{sm2}$ may be transferred to the device in a similar way.

Advantageously, providing the device with the obtained data ($V_{sm2}$) may further comprise the steps of:

generating Diffie-Hellman keys $Pub_d$, $Priv_d$ on the device;

generating Diffie-Hellman keys on the subscription manager ($Pub_s$, $Priv_s$);

providing the subscription manager with $Pub_d$ (which should be signed with $S_{gen}$);

providing the device with $Pub_s$ (which should be signed with $S_{sm1}$);

generating a session key $K_{session}$ based on $Pub_d$ and $Priv_s$; and sending the obtained data ($V_{sm2}$) to the device protected by the session key $K_{session}$. Preferably, $Pub_d$ should be signed with $S_{gen}$. Preferably and to improve security, $Pub_s$ should be signed with $S_{sm1}$. Therefore, $V_{sm2}$ is protected using Diffie-Hellman.

Optionally, the first provisioning data may further comprise a group key, $S_{group}$, and a device key, $S_{device}$, wherein $S_{group}$ is provided to a plurality of devices and wherein $S_{device}$ is unique to the device, and further wherein authenticating the device comprises the step of the device signing the message using $S_{device}$ and $S_{group}$.

Preferably, the subscription manager may use a key $V_{device}$ to verify the signature of the message constructed using $S_{device}$ and/or uses a key $V_{group}$ to verify the signature of the message constructed using $S_{group}$, wherein $V_{device}$ forms a key pair with $S_{device}$ and $V_{group}$ forms a key pair with $S_{group}$.

The elliptic curve digital signature algorithm (ECDSA) or another algorithm may be used with these keys.

Optionally, the first provisioning data may further comprise a symmetric group key, $K_{group}$, and a symmetric device key, $K_{device}$ or one of the keys may be symmetric, while the other is asymmetric.

Preferably, the part or all of provisioning data may be stored within a secure execution environment, SEE, within the device. This improves security. Furthermore, the processing or generation of cryptographic material may take place within the SEE. For example, $K_{group}$ may be stored but not $K_{device}$.

Optionally, the first provisioning data may include a subscription manager verification key, $V_{sm1}$, allowing the device to verify communications from the first or initial subscription manager. Such communications may be protected using a first signature key, $S_{sm1}$, wherein $V_{sm1}$ and $S_{sm1}$ form an asymmetric key pair. The keys may be generated by an ECDSA or another algorithm, for example. $V_{sm1}$ and $S_{sm1}$ may be generated in advance and $V_{sm1}$ applied to batches of devices (or SEE to be incorporated into devices). Preferably, $V_{sm1}$ and $S_{sm1}$ are changed at intervals to improve security. $S_{sm1}$ is known by the subscription manager (i.e. an initial subscription manager).

Preferably, the subscription manager may use a key $V_{device}$ to verify signatures constructed using $S_{device}$ and/or use a key $V_{group}$ to verify signatures constructed using $S_{group}$, wherein $V_{device}$ forms a key pair with $S_{device}$ and $V_{group}$ forms a key pair with $S_{group}$. Again, ECDSA or another algorithm may be used with these keys.

Optionally, the key pair $V_{device}$ and $S_{device}$ may be generated by a separate entity to the entity that generates the key pair $V_{group}$ and $S_{group}$. For example, $V_{device}$ and $S_{device}$ may be generated by the manufacturer of the device (e.g. M2M device). $V_{group}$ and $S_{group}$ may be generated by the manufacturer of the SEE, or a component hosting the SEE, for example.

Preferably, the key pair $V_{device}$ and $S_{device}$ are generated by a separate entity (e.g. OEM) to the key pair $V_{group}$ and $S_{group}$ (e.g. manufacturer of the SEE).

Optionally, the second provisioning data may be one or more additional secrets $K_{add}$, the method may further comprise the steps of generating the one or more additional secrets $K_{add}$, and providing the one or more additional secrets $K_{add}$ to the device. $K_{add}$ may be operator credentials, for example.

Preferably, the one or more additional secrets $K_{add}$ may be generated in advance. This may be on the server-side, for example.

Optionally, the one or more additional secrets $K_{add}$ may be provided to the device by deriving the one or more additional secrets $K_{add}$ from a session key using a key derivation operation carried out within the device. The session key may be the session key $K_{session}$, based on $Pub_d$, $Priv_d$, $Pub_s$, and $Priv_s$, described above.

According to a second aspect, there is provided a system for provisioning a subscription of a service to a device, the system comprising:
  a secure communications interface;
  logic configured to:
  receive a message from a device, the message protected by first provisioning data installed on the device;
  authenticate the message using data corresponding to the first provisioning data;
  on successful authentication, provide the device with data enabling the device to recover protected second provisioning data from a subscription manager; and
  providing the device with the protected second provisioning data.

Optionally, the logic may be part of a further subscription manager. This further subscription manager may be a separate component or entity from the subscription manager. The system may include one or more subscription managers, a plurality of devices, and a communications network (e.g. cellular) for communicating between the one or more subscription managers. Preferably, the system may include a server or other entity for generating keys or key pairs for initially provisioning the devices. Preferably, the system may include a server or other entity for generating keys or key pairs for including in secure execution environments to be added to the devices. These servers or other entities may also communicate with the one or more subscription managers over the communications network, which will preferably be secure.

In accordance with a third aspect, there is provided apparatus for provisioning a subscription of a service to a device, the apparatus comprising:
  one or more interfaces configured to communicate with a device and a subscription manager; and
  logic configured to:
    receive cryptographic data from the device over the one or more interfaces;
    transmit the cryptographic data to the subscription manager over the one or more interfaces;
    receive provisioning data from the subscription manager over the one or more interfaces; and
    transmit the provisioning data to the device over the one or more interfaces, wherein the provisioning data is configured to validate or enable a subscription of the device to a service.

The apparatus may be a technician device. Advantageously, the device being provisioned via the technician device does not have any pre-loaded keys or secrets. This avoids the need for unique personalisation at an OEM. The device may be a M2M device or M2M device incorporating a SIM, UICC, embedded SIM or other SEE, for example.

Optionally, the logic may be further configured to digitally sign the cryptographic data with a signature key before transmission to the subscription manager. This improves security.

Optionally, the one or more interfaces are either wireless or cellular or one or more of both. In one embodiment there may be a cellular interface to the device manager and a WiFi or wired interface to the device. In another embodiment the apparatus may interface with the device over a cellular interface and so avoid the device requiring more than one interface. In such an embodiment, the apparatus effectively acts as a femtocell.

Optionally, the cryptographic data may be digitally signed as part of a Diffie-Hellman exchange between the device and the subscription manager.

Optionally, apparatus may further comprise a UICC, SIM, embedded SIM or other secure execution environment, SEE, configured to generate or store the signature key.

Preferably, the logic may be further configured to authenticate the provisioning data before transmitting the provisioning data to the device.

Optionally, the logic may be further configured to digitally sign the provisioning data before transmitting the provisioning data to the device.

Optionally, the provisioning data may be digitally signed as part of a Diffie-Hellman exchange between the device and the subscription manager.

Preferably, the provisioning data may be digitally signed by the subscription manager and authentication of the provisioning data is performed by verifying the digital signature.

Preferably, the provisioning data may be protected by the cryptographic data.

Optionally, the logic may be further configured to confirm a paired connection with the device.

Optionally, the one or more interfaces may be either wireless or cellular or one or more of both.

Preferably, the cryptographic data is a public key of a public and private key pair provided by the device.

Preferably, the logic may be further configured to verify the source of the provisioning data, and re-sign it before transmitting it to the device. The apparatus should be able to verify the source of the provisioning data, and re-sign it for the benefit of the target device. In other words, the apparatus acts as a conduit, but nevertheless the provisioning data cannot be intercepted by tampering with the apparatus.

In accordance with a fourth aspect there is provided a method for provisioning a subscription of a service to a device, the method comprising the steps of:
  receiving cryptographic data from a device over one or more interfaces;
  transmitting the cryptographic data to the subscription manager over the one or more interfaces;
  receiving provisioning data from the subscription manager over the one or more interfaces; and
  transmitting the provisioning data to the device over the one or more interfaces, wherein the provisioning data is configured to validate or enable a subscription of the device to a service.

Optionally, the provisioning data may be received from the device manager encrypted to exclude access by the provisioning apparatus. A Diffie-Hellman exchange, similar to that described previously, may be used.

Optionally, the method may further comprise the step of authenticating the source of the provisioning data before transmission to the device.

Preferably, the method may further comprise the step of digitally signing the provisioning data with a signature key before transmission to the device.

Preferably, the provisioning data may be a shared secret between the device and the subscription manager.

According to a further aspect, there is provided a system comprising one or more apparatuses or devices for provisioning a subscription of a service to a plurality of devices, one or more one or more subscription managers, a plurality of devices, and a communications network (e.g. cellular) for communicating between the one or more subscription managers, apparatuses and/or devices. Preferably, the system may include a server or other entity for generating keys or key pairs for initially provisioning the devices. Preferably, the system may include a server or other entity for generating cryptographic material such as keys or key pairs for including in secure execution environments to be added to or within the devices. These servers or other entities may also communicate with the one or more subscription managers over the communications network, which will preferably be secure.

According to a further aspect, there is provided a method of manufacturing a device in which a single wafer is cut into dies (with each die receiving both a secure and a non-secure component). One die may be inserted per chip package.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks, cellular and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
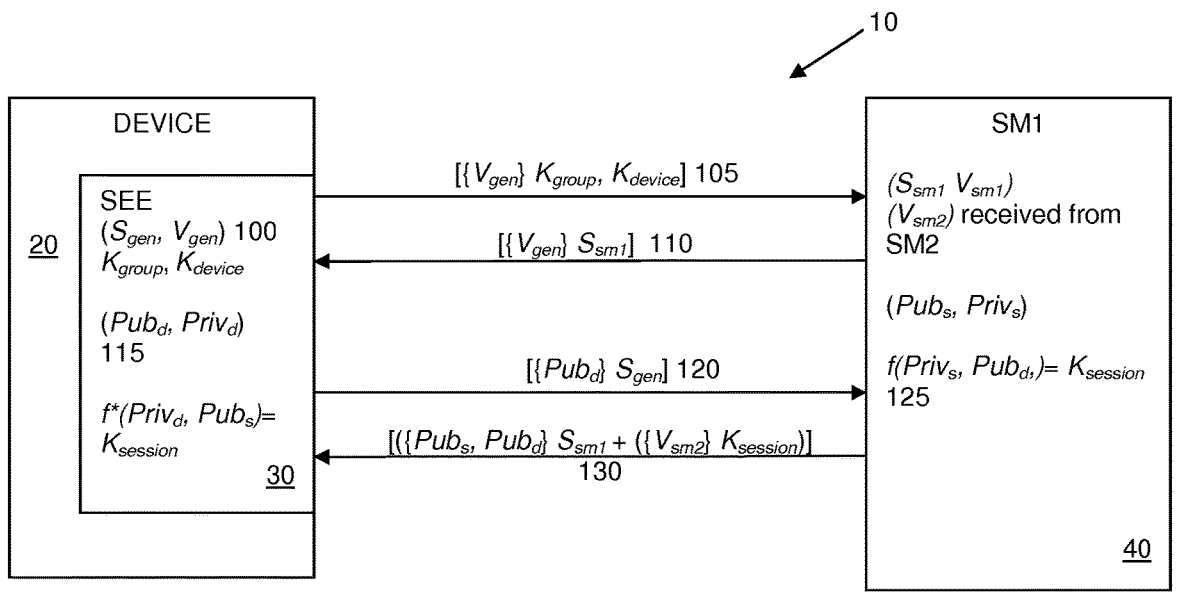
FIG. 1 shows a schematic diagram of a portion of a system for provisioning a device including a first subscription manager.

We propose an approach which removes the "detour" through a secure SIM card personalization centre.

As a guide to notation, $K_x$ denotes a generic secret key. This may be a symmetric key, or the secret half of an asymmetric key-pair. Elliptic Curve Digital Signature Algorithm (ECDSA) keys are written as $S_y$ for a signature key, and $V_y$ for a signature verification key (so that $S_y$ and $V_y$ form a key-pair). Elliptic Curve Diffie-Hellman keys are written as $Priv_z$ for a private key (including the field parameters and private exponent) and $Pub_z$ for the corresponding public key.

A secure execution environment (SEE) may come already provisioned with a group key ($K_{group}$) from the silicon vendor or manufacturer, preferably as part of the ROM mask. This may be either a symmetric key, or the signature key $S_{group}$ of an asymmetric keypair ($S_{group}$, $V_{group}$). To protect against man-in-the-middle attacks, an Initial (or first) Subscription Manager may have an asymmetric key pair ($S_{sm1}$ and $V_{sm1}$) and the SEE will come provisioned with the initial subscription manager verification key ($V_{sm1}$). A device-unique key ($K_{device}$) may be loaded once the SEE is integrated by a full M2M device manufacturer (OEM). Again, this may be a symmetric key, or the signature key $S_{device}$ of an asymmetric keypair ($S_{device}$, $V_{device}$). These keys should be used only once per device and then replaced with persistent keys.

The Initial Subscription Manager knows the server-side signature key ($S_{sm1}$), the group key ($K_{group}$ if symmetric or $V_{group}$ if asymmetric), and the OEM-provided keys ($K_{device}$ if symmetric, or $V_{device}$ if asymmetric). The Initial Subscription Manager must ensure that no other entity knows $S_{sm1}$, and that no other entity knows both $K_{group}$ and $K_{device}$. The Initial Subscription Manager requires secure interfaces with both the silicon vendor and the OEM to exchange keys.

The Initial Subscription Manager could, for example, generate a symmetric group key or a group key-pair and provide $K_{group}$ to the silicon vendor, or receive a symmetric $K_{group}$ after it has been generated by the silicon vendor, or receive the group verification key $V_{group}$ after the group key-pair has been generated by the silicon vendor. Similarly, the Initial Subscription Manager could, for example, provide secret keys $K_{device}$ and corresponding serial numbers to the OEM for loading to devices, or else receive symmetric keys ($K_{device}$) from the OEM after they have been loaded to each device, or receive verification keys $V_{device}$ from the OEM after the corresponding signature keys $S_{device}$ have been loaded to each device.

1. Preferably, the group key ($K_{group}$) and the initial server-side key ($S_{sm1}$, $V_{sm1}$) should be changed regularly when producing new batches of devices.
2. The initial keys ($K_{group}$, $K_{device}$, $V_{sm1}$), should ideally be used only once per device, at first authentication with the Initial Subscription Manager, then replaced with fresh device-specific keys.
3. At least one fresh ECDSA keypair ($S_{gen}$, $V_{gen}$) shall be generated on the device within the SEE. A new ECDSA verification key $V_{gen}$ shall be reported to the Initial Subscription Manager, integrity-protected using both the group key and the OEM device key, and then signed by a "liable representative" (e.g. the Initial Subscription Manager themselves). The $V_{gen}$ signed by the liable representative is called the "Device Cert". The ISM shall return an acknowledgement to the device that $V_{gen}$ has been received and verified. This acknowledgement may consist of the Device Cert itself, if signed using $S_{sm1}$; if not, the acknowledgement shall be signed using $S_{sm1}$.

FIG. 1 illustrates schematically the system 10 of a device 20 having a SEE 30 and Initial Subscription Manager 40, described above. The steps of this process are also shown in table 1.

TABLE 1

| Device | SM1 |
|---|---|
| Generate ECDSA key-pair ($S_{gen}$, $V_{gen}$) 100 | |
| ---------------- Device's ECDSA key $V_{gen}$ integrity-protected using both $K_{group}$ and $K_{device}$ --------------> 105 | |
| | Verify device's ECDSA key $V_{gen}$ and issue Device Cert |
| <----- $V_{gen}$ signed using $S_{sm1}$ [could be Device Cert] --- 110 | |

4. At least one fresh ECDSA verification key $V_{sm2}$ shall be transferred to the device to authenticate each Subscription Manager used for further update operations. The first time this operation is performed, the device must contact the Initial Subscription Manager; after that, it may contact any known Subscription Manager to introduce a new one. The key-pair ($S_{sm2}$, $V_{sm2}$) is generated preferably in advance by each Subscription Manager, and $S_{sm2}$ stored safely. It is safe to use the same ECSDA key $S_{sm2}$ at the Subscription Manager for multiple devices; however, if the SM has several ECDSA keys, then the SM will keep track of which device has which key.

Direct signing of one ECDSA key by another (e.g. signing $V_{sm2}$ using $S_{sm1}$) is not recommended, as it is hard to revoke such a signature. Instead, such a verification key should be encrypted and integrity-protected using ECDH session keys ($K_{session}$), arising from an authenticated ECDH exchange. Both the device ($S_d$) and server-side ($S_{sm1}$) ECDSA keys must sign the exchange. To avoid the costs of repeatedly generating ECDH keys, a fixed field and generator may be used, but with variable private exponents chosen.

Figure 2:
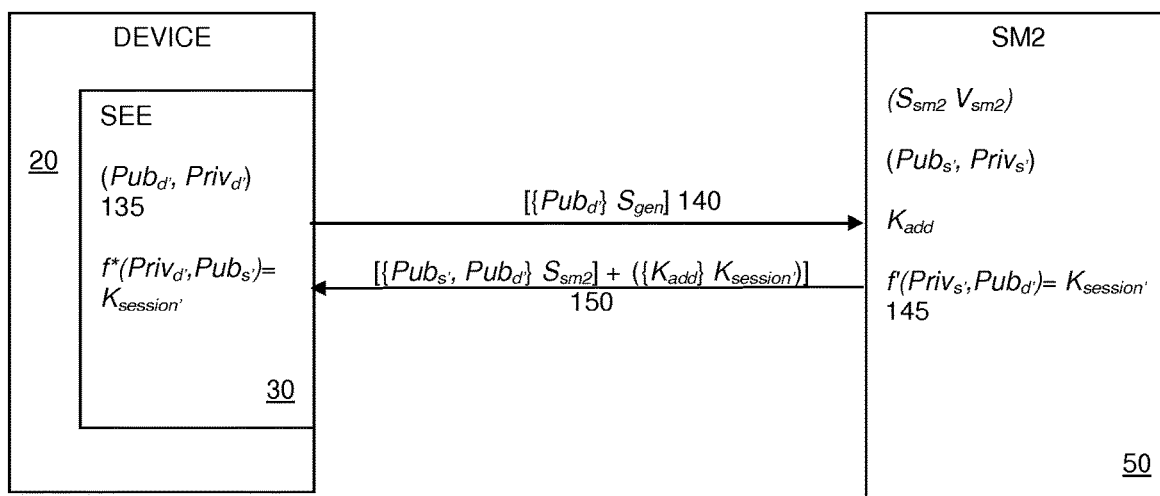
FIG. 2 shows a further portion of the system of FIG. 1 including a second subscription manager.

FIG. 2 illustrates schematically the system of the device 20 and Subscription Manager 50, described above. The steps of this process are also shown in table 2. The steps shown in table 2 and FIG. 2 may be carried out by the same subscription manager as those of table 1 and FIG. 1 (i.e. an initial subscription manager) or any subscription manager that is already known to the device.

TABLE 2

| Device | SM1 |
|---|---|
| Generate ECDH key-pair ($Priv_d$, $Pub_d$) 115 | |
| --Device's ECDH $Pub_d$ signed using $S_{gen}$ [+ Device Cert] --> 120 | |
| | Verify signature on $Pub_d$ |
| | Generate ECDH key-pair ($Priv_s$, $Pub_s$) and compute ECDH shared secret $K_{session}$ from $Priv_s$ and $Pub_d$ 125 |
| <-------- Server's ECDH $Pub_s$ + $Pub_d$, signed using $S_{sm1}$ + ---- { $V_{sm2}$ } encrypted and integrity protected by ECDH shared secret $K_{session}$ 130 [note $S_{sm2}$ and $V_{sm2}$ for SM2] Verify signature on $Pub_s$+$Pub_d$ Compute ECDH shared secret $K_{session}$ from $Priv_d$ and $Pub_s$ and recover $V_{sm2}$ | |

5. Additional secrets $K_{add}$ (in particular operator credentials $K_{op}$) may be generated at the server-side. They may be generated in advance and (safely) stored in anticipation, and then encrypted and integrity protected using session keys ($K_{session}$) arising from an authenticated ECDH exchange set up as described in step 4 above. Alternatively, if they have not been generated in advance, they may be generated from $K_{session}$ by a suitable key derivation operation which may also be implemented on the device. Such additional secrets must not be encrypted using the group key ($K_{group}$) or OEM key ($K_{device}$). $K_{group}$ and $K_{device}$ should ideally be used once, but never again.

TABLE 3

| Device | SM2 |
|---|---|
| Generate ECDH key-pair ($Priv_d$, $Pub_d$) 135 | |
| ---------------- Device's ECDH $Pub_d$ signed using $S_{gen}$ [+ Device Cert] ---------------> 140 | |
| | Verify signature on $Pub_d$ Generate ECDH key-pair ($Priv_s$, $Pub_s$) and compute ECDH shared secret $K_{session}$' from $Priv_s$' and $Pub_d$, 145 |
| <------------------ Server's ECDH $Pub_s$' + $Pub_d$, signed using $S_{sm2}$ + ------------------ { $K_{add}$ } encrypted and integrity protected by ECDH shared secret $K_{session}$ 150 Verify signature on $Pub_s$ + $Pub_d$ Compute ECDH shared secret $K_{ecdh}$ from $Priv_d$ and $Pub_s$ and recover $K_{add}$ | |

Optional Features/Variations:

Steps 3, 4 and 5 are very similar in their structure, and indeed it is possible to combine two of them (or all three of them) by concatenating the outgoing and incoming messages for each step; this reduces the total number of passes required for the protocol, and hence reduces the overall execution time for the protocol.

A safer way to handle errors is that if the device fails to receive a response from the server (or if the response is invalid), then it should re-start the whole protocol.

An explicit acknowledgement message from the device may be sent at the end of the protocol, or there may be an implicit acknowledgement by successful use of the credentials delivered in Step 5.

Preferably, there should also be a backoff policy to suppress large numbers of failed authentication attempts and protocol restarts.

These features avoid the "detour" though still require a unique personalization at the OEM. However, the OEM usually has to provision something unique per device (e.g. a serial number or MAC address) so it is relatively straightforward to inject a unique key at the same time.

Typical device OEMs may not have a reputation for secure key generation and key handling. However, one advantage of the present system is that an OEM-provided device key would not have to be hugely trustworthy by itself, since the device will be authenticated by a combination of the device key (from OEM) and group key (from silicon vendor) and then the OEM key will be replaced. Therefore, an attacker would need to compromise both these keys to impersonate the device. For example, the key may be equal to or derived from a serial number or MAC address. Provided the device Serial Number/MAC address is not known to the attacker in advance (and provided the derived key $K_{device}$ is only used once), this may provide sufficient security.

Clearly, a risk of such a solution is that the group key may itself become compromised by a physically invasive attack on just one SEE. The ability of even high end smart cards to protect "master" keys is mixed: they have been extracted in PayTV solution, whereas operator algorithm configuration parameters (shared across multiple SIM cards) generally have not been extracted: the likely reason is that these have little value by themselves to an attacker.

Therefore, the risk of a hacked group key is reduced by making the hacking attempt have little value to the attacker. If all of steps 1-5 are deployed, then a compromised group key would only be usable to impersonate devices which had been manufactured recently (i.e. up to the last key change), whose OEM device keys had also leaked, and which had not yet been remotely provisioned with their fresh device-specific keys: a rather limited attack window. Devices that were already remotely provisioned at the time of compromise would be unaffected. Further, being able to impersonate a device during this window would have rather little value. To gain actual network access credentials (e.g. a cellular operator's K), an attacker would need to know which device id(s) were requesting them, from which operator, and when. The attacker would then need to enter into a race condition with the legitimate device to request and retrieve the credential, and there would be an opportunity for the operator to detect the duplicate registration requests. This looks like it is a difficult attack to execute, for little value.

Another advantage is that the form factor of SEE becomes highly flexible: it no longer needs standardized contacts for injecting key material at a personalization centre, and no longer needs its own dedicated packaging and card reader (or its own pins/bus) within the device.

The SEE silicon could for instance be transmitted to the OEM in wafer form, for integration into an existing package (as for instance with InSIM). This is still not "soft SIM", since the SEE would still be protected e.g. against invasive physical attacks, and side channel attacks.

In one example implementation, a single wafer may consist of secure components (the SEE) and non-secure components (e.g. a modem or baseband core). This means a single wafer can be cut into dies (with each die receiving both a secure and a non-secure component), and then one die inserted per chip package.

In summary, the method may be described as a set of steps of a protocol. The end result of the protocol is for the device 20 to be subscribed to a service by a subscription manager 50 with provisioning data stored within the device. Initially, the device 20 will have installed keys $K_{group}$ and $K_{device}$ (i.e. first provisioning data). As described previously, these may be symmetric or asymmetric keys. The device will generate the key pair $S_{gen}$, $V_{gen}$ 100. $V_{gen}$ is sent as part of a message protected by $K_{group}$ and $K_{device}$ 105 to the initial or further subscription manager 40 (SM1). The subscription manager 50 (SM2) and further subscription manager 50 may be functions of the same entity (i.e. a single subscription manager) or separate entities.

$V_{gen}$ and $S_{gen}$ form a key pair where $S_{gen}$ may be used to sign messages.

The subscription manager 50 generates the key pair $S_{sm2}$, $V_{sm2}$. This may be done in advance or before the protocol executes. The further (or initial) subscription manager 40 receives from the subscription manager 50 $V_{sm2}$. This should be by a secured connection (not shown in the figures).

The further subscription manager 40 has already generated a key pair $S_{sm1}$, $V_{sm1}$. The further subscription manager 40 sends a confirmation of receipt of $V_{gen}$ to the device 20 by signing it with $S_{sm1}$ 110.

A Diffie-Hellman key exchange is set up between the device 20 and the further subscription manager 40 (steps 115-130). This is used to provide the device 20 with $V_{sm2}$. The purpose of this is to enable the device 20 to authenticate the subscription manager 50 when it recovers the second provisioning data ($K_{add}$) to be able to subscribe to the service. Whilst authentication of the subscription manager 50 with the device 20 is preferable, the device 20 may be provisioned to the service by the subscription manager 50 without such precautions but with increased risk to the device subscriber.

With the device 20 now in possession of data that allows the device to securely recover the second provisioning data, the subscription manager 50 and the device 20 can initiate their own Diffie-Hellman key exchange (135-150) to set up a session key $K_{session}$. The second provisioning data ($K_{add}$) being sent to the device 20 protected (in this embodiment, both signed and encrypted) by $K_{session}$.

Figure 3:
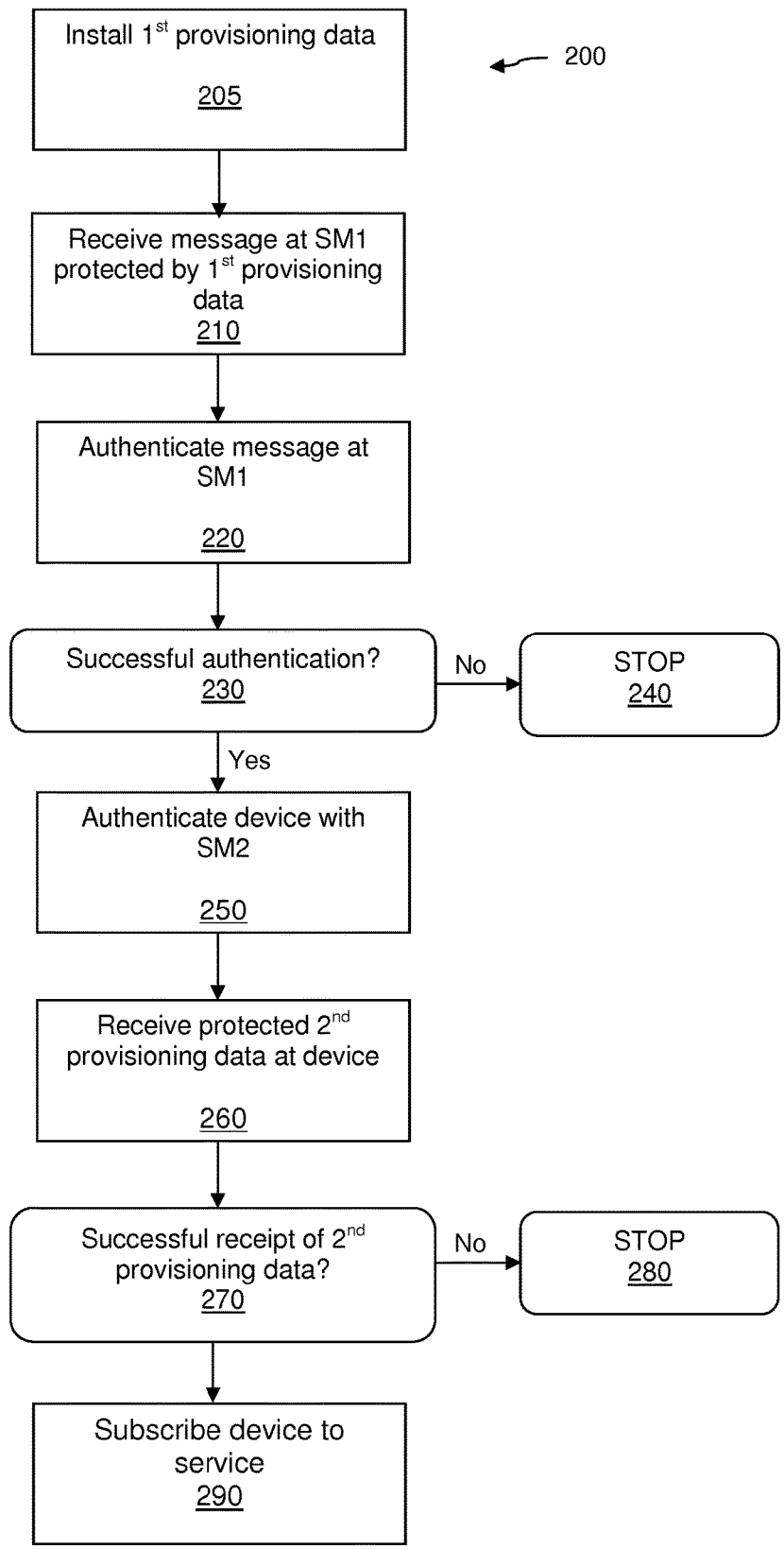
FIG. 3 shows a flowchart of a method for provisioning a device using the system of FIGS. 1 and 2.

FIG. 3 shows a flowchart of a method 200 for provisioning a subscription of a service to a device. The subscription manager 50 is used to subscribe the device 20 to the service. First, temporary or single use provisioning data are installed on the device 20 at step 205. At step 210 the first provisioning data is used to protect a message sent from the device 20 to the further subscription manager 40. The first provisioning data is authenticated by the further (initial, SM1) subscription manager 40 at step 220.

If authentication is not successful 230 then the process stops 240 (and has to restart) or an error is returned.

If authentication is successful 230 then the further subscription manager 40 provides the subscription manager 50 with data that may be subsequently used to authenticate the device for provisioning at step 250. In addition, SM1 may provide $V_{sm2}$ to the device, and the device then uses this to authenticate SM2. The subscription manager (SM2) 50 sends the protected second provisioning data to the device 20 at step 260. As the further subscription manager 50 has already sent the device 20 data necessary to recover the protected second provisioning data then the device 20 can obtain the protected second provisioning data and use it to obtain the service.

At step 270, the second provisioning data is either successfully received, in which case the device is subscribed to the service (step 290) or if not then the process stops (step 280).

As described previously, there are certain disadvantages in provisioning a (relatively expensive) SIM card. In one example implementation a technician or other person may use a handheld device 240 to login to a DM portal, under the M2M customer's account. They may then request a new credential or provisioning data for transmission to a target M2M device 20. The interaction between the target device 20 and the technician device 240 is shown schematically in FIG. 4.

The handheld device 240 can be moderately sophisticated in this scenario. For example it may have suitable connectivity and interfaces to request and retrieve credentials. This may be cellular connectivity, WiFi connectivity or both. Preferably, the handheld device can be authenticated by its own SIM—either traditional or embedded—so that the connection to the portal is secure and seamless.

This approach comes with the same broad risks as physical SIM distribution. The technician's device 240 might get stolen, similar to stealing a stack of SIM cards. The technician might be a thief, or acting in concert with a thief, or may just make a mistake. There are some requirements to optimize the solution and mitigate these risks:

1. Suitable anti-fraud measures should be deployed, similar to existing ways to prevent abuse of SIM cards e.g. preventing voice, limiting data, limiting connections to certain addresses etc.
2. The M2M customer takes financial liability for the credential or provisioning data (i.e. the customer can't repudiate bills if the credential is lost or used by wrong device, or the technician is rogue). This ensures that risks of technician error or abuse will be managed by the party most able to control them. For example the M2M customer may require that the technician has to be authenticated to the technician device 240 (e.g. must enter a PIN, or use fingerprint).
3. The credential is transmitted over an end-to-end secured connection into the target device, so that a thief is unable to intercept it en route, or at the technician device 240.

Other Features which would Improve the Solution:

4. Relaying of the credential from the technician device 240 to the target M2M device 20 should be done via a local wireless protocol, rather than plugging in a cable. An automated short-range pairing may be used to minimize the risk of the credential arriving at the wrong device.
5. The "local" wireless protocol should ideally be an instance of the "global" protocol used by the target device 20, so that handheld device acts like a femtocell or cellular base station, for example. This reduces the number of radio protocols that the M2M device 20 must support, and so reduces cost and complexity.

Figure 4:
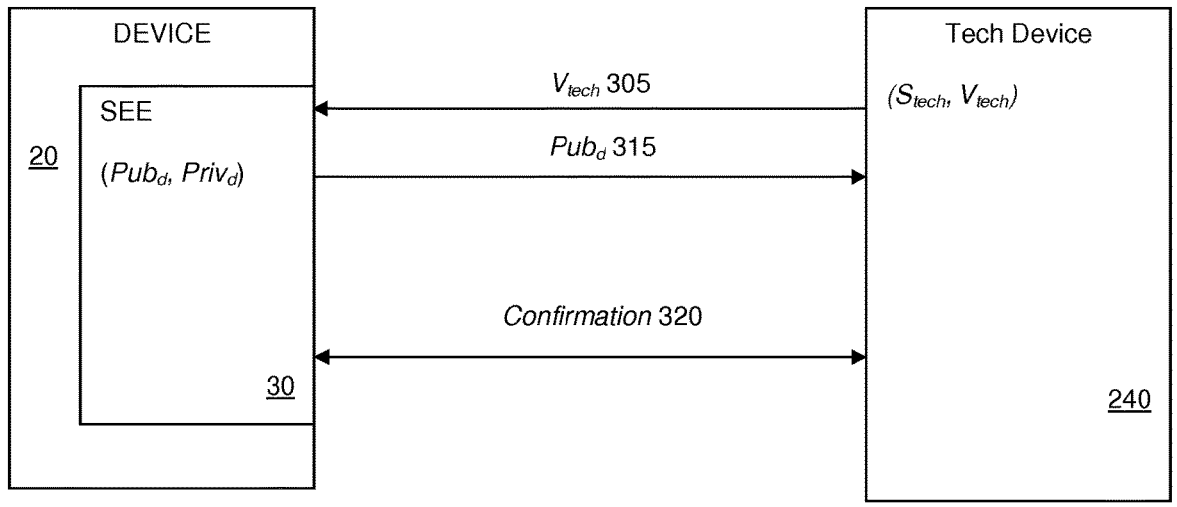
FIG. 4 shows a portion of a further system for provisioning a device.

In the case of "technician configuration" then the technician's device 240 will have been provisioned with an ECDSA signature key and certificate, but the target device 240 usually will not. The target device 20 does however have the means to generate an ECDH public key and send it over a local wireless protocol. The technician device 240 and target device 20 exchange and confirm each other's public keys. Table 4 and FIG. 4 illustrate the communications between the technician device 240 and the target device 20 in more detail. This communication could use an out-of-band hash like flashing lights, audio tones etc. or a loud noisy burst of is/Os matching the hash.

The local protocol should be sufficiently short-range and short-lived to make a Man In The Middle attack very unlikely anyway. However, note that the technician device will play a critical security role, and must be protected against tampering e.g. attempts to insert a Man In The Middle on the technician's device 240 itself.

TABLE 4

| Target Device | Technician Device |
|---|---|
| <---------------- Technician Device's ECDSA public key [or cert] 305 | |
| | Generate ECDH key-pair (Pub$_d$, Priv$_d$) 310 |
| <---------------- Target Device's ECDH public key Pub$_d$ ----------------------------> 315 | |
| <<--------- local short-range protocol to confirm Hash (public keys) ---------->> 320 | |

Figure 5:
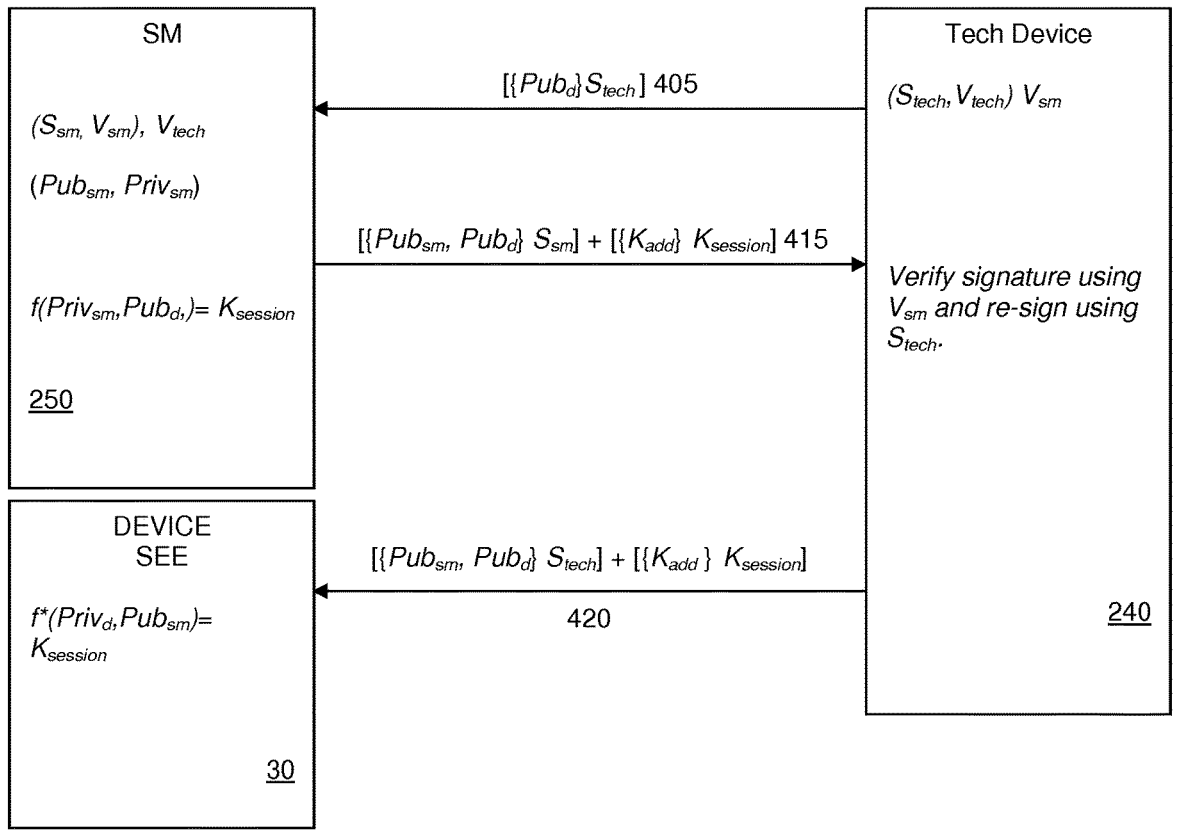
FIG. 5 shows a further portion of the system of FIG. 4.

The technician's device 240 signs the ECDH public key Pub$_d$ before forwarding it to a subscription manager 250, and subsequently signs the subscription manager's ECDH public key Pub$_{sm}$ before forwarding it to the target device 20. These communications are summarised in tables 5 and 6 and FIG. 5.

TABLE 5

| Technician Device | SM |
|---|---|
| ------Signed Target Device's ECDH public key Pub$_d$ [+Technician Device cert] 405-----> | |
| | Authorization Decision: |
| | Is the Technician Device signature acceptable? (From an M2M customer who agrees liability for credential). Generate ECDH key-pair Pub$_{sm}$, Priv$_{sm}$ and compute ECDH shared secret K$_{session}$ 410 |
| <-------------------- Signed SM's (and Device's) ECDH public key Pub$_{sm}$, Pub$_d$ [+ SM cert] ---------------- + {credentials V$_{sm}$} encrypted and integrity protected by ECDH shared secret 415 | |
| Verify signature on SM's ECDH public key Pub$_{sm}$, and re-sign with own ECDSA key S$_{tech}$ 420 | |

TABLE 6

| Target Device | Technician Device |
|---|---|
| <------------------------ Re-Signed SM's (and Device's) ECDH public key ------------------------+ {credentials} encrypted and integrity protected by ECDH shared secret | |
| Compute ECDH shared secret and decrypt credentials | |

Figure 6:
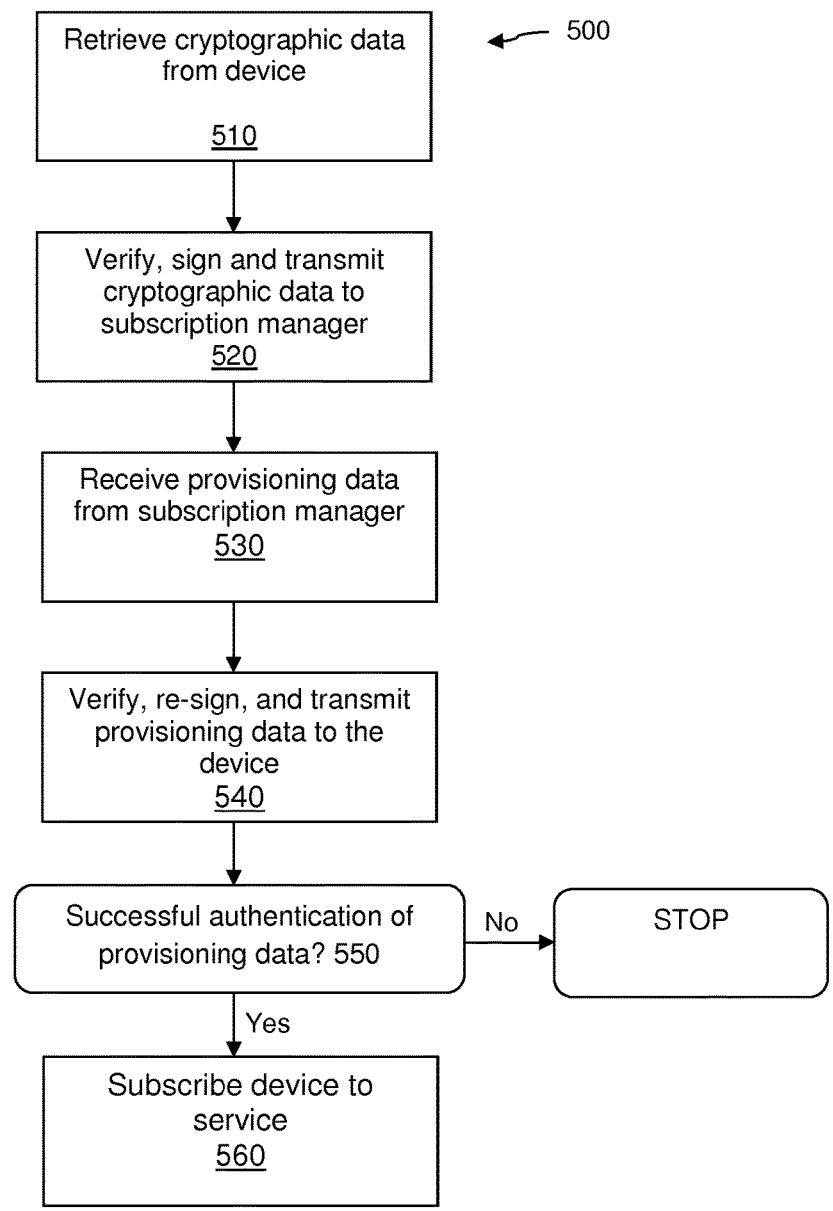
FIG. 6 shows a flowchart of a method for provisioning a device using the system of FIGS. 4 and 5.

FIG. 6 shows a flowchart of a method 500 for using the technician's device 240 to provision a device 20. At step 510, cryptographic data Pub$_d$ is retrieved from the device 20.

At step 530 provisioning data is received by the technician device from the subscription manager 250. The technician device 240 then verifies, re-signs, and transmits the provisioning data K$_{add}$ to the device 20 at step 540. K$_{add}$ is authenticated and recovered by the device 20 at step 550. On successful authentication then the device 20 is subscribed to the service.

The service may include: voice calls, data communication, SMS, MMS, 3G, 4G, LTE or other services, for example.

As will be appreciated by the skilled person, details of the above embodiment may be varied without departing from the scope of the present invention, as defined by the appended claims.

For example, the two initial keys are described as coming from "the silicon vendor" and "the full M2M device manufacturer (OEM)". However, these may be any "first party" and "second party". Furthermore, the public (verification) part V$_{gen}$ of that key pair is sent to the Initial Subscription Manager 40, signed by K$_{group}$, K$_{device}$. K$_{group}$ and K$_{device}$ are not necessarily installed first with the key pair generation and public key export happening later. An alternative order of events would be for at least one of K$_{group}$ and K$_{device}$ to be installed AFTER the key pair generation, although still before the public key export.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method, which is performed by an initial subscription manager acting as an initial intermediary between (i) a device and (ii) a subscription manager, to enable the subscription manager to be authenticated with the device so that the subscription manager can then subsequently provision a subscription of a service to the device, the method comprising the initial subscription manager performing at least the following:
   receiving a message from the device, wherein the message includes a first signature verification key such that the initial subscription manager receives the first signature verification key from the device via the message, and wherein, prior to the message being received at the initial subscription manager, the device authenticates the message by protecting the message using provisioning data;
   returning, to the device, an acknowledgement that the first signature verification key has been received by the initial subscription manager, the acknowledgement comprising a signed version of the first signature verification key;
   authenticating the message using data corresponding to the provisioning data;
   receiving, from the subscription manager, a second signature verification key that is configured to enable the subscription manager to be subsequently authenticated with the device; and
   subsequent to authenticating the message using the data corresponding to the provisioning data, providing the second signature verification key to the device, wherein the second signature verification key, which was received by the initial subscription manager from the subscription manager and which was sent by the initial subscription manager to the device, is configured to enable the device to authenticate the subscription manager such that the initial subscription manager acts as an initial intermediary between the device and the subscription manager.

2. The method of claim 1, wherein, subsequent to authenticating the message using the data corresponding to the provisioning data, data enabling the device to recover protected second provisioning data is provided to the device or to the subscription manager.

3. The method of claim 1, wherein the subscription manager receives the message from the device.

4. The method according to claim 1, wherein the message comprises a signature verification key $V_{gen}$ corresponding to a signature key $S_{gen}$ of the device.

5. The method of claim 4, wherein providing the device with the second signature verification key further comprises the steps of:
   generating Diffie-Hellman keys $Pub_d'$, $Priv_{d'}$ on the device;
   generating Diffie-Hellman keys on the subscription manager;
   providing the subscription manager with $Pub_d'$ protected by $S_{gen}$;
   providing the device with $Pub_s'$;
   generating a session key $K_{session}'$ based on $Pub_d'$, and $Priv_s'$; and
   sending the second signature verification key to the device protected by the session key $K_{session}'$.

6. The method of claim 4, wherein $V_{gen}$ and $S_{gen}$ are generated after the provisioning data are installed on the device.

7. The method according to claim 4, the method further comprising the subscription manager providing a message acknowledgment comprising $V_{gen}$ signed by a signature key $S_{sm1}$.

8. The method according to claim 1, wherein the second signature verification key, which enables the device to authenticate the subscription manager, is a signature verification key $V_{sm2}$ of the subscription manager.

9. The method of claim 8, wherein $V_{sm2}$ has a corresponding signature key $S_{sm2}$.

10. The method of claim 9, wherein providing the device with the second signature verification key further comprises the steps of:
    generating Diffie-Hellman keys $Pub_d'$, $Priv_{d'}$ on the device;
    generating Diffie-Hellman keys on the subscription manager;
    providing the subscription manager with $Pub_d'$;
    providing the device with $Pub_s'$ protected by $S_{sm2}$;
    generating a session key $K_{session}'$ based on $Pub_d'$ and $Priv_s'$; and
    sending the second signature verification key to the device protected by the session key $K_{session}'$.

11. The method according to claim 1, wherein the first provisioning data further comprise a group key, $S_{group}$, and a device key, $S_{device}$, wherein $S_{group}$ is provided to a plurality of devices and wherein $S_{device}$ is unique to the device, and further wherein authenticating the device comprises the step of the device signing the message using $S_{device}$ and $S_{group}$.

12. The method of claim 11, wherein the subscription manager uses a key $V_{device}$ to verify a signature of the message constructed using $S_{device}$ and/or uses a key $V_{group}$ to verify the signature of the message constructed using $S_{group}$, wherein $V_{device}$ forms a key pair with $S_{device}$ and $V_{group}$ forms a key pair with $S_{group}$.

13. The method of claim 12, wherein the key pair $V_{device}$ and $S_{device}$ are generated by a separate entity to the entity that generates the key pair $V_{group}$ and $S_{group}$.

14. The method according to claim 11, wherein the first provisioning data further comprise a symmetric group key, $K_{group}$ and/or a symmetric device key, $K_{device}$.

15. The method according to claim 1, wherein the second verification key includes one or more secrets $K_{add}$, the method further comprising the steps of generating the one or more secrets $K_{add}$, and providing the one or more secrets $K_{add}$ to the device,
    wherein the one or more secrets $K_{add}$ are generated in advance, and
    wherein the one or more secrets $K_{add}$ are provided to the device by deriving the one or more secrets $K_{add}$ from a session key using a key derivation operation carried out within the device.

16. A system for provisioning a subscription of a service to a device, the system comprising:
    a secure communications interface;
    an initial subscription manager;
    one or more processors; and
    one or more computer-readable hardware storage devices having stored thereon computer-executable instructions that are executable by the one or more processors to cause the initial subscription manager of the system to perform at least the following:
    receive a message from a device, wherein the message includes a first signature verification key such that the initial subscription manager receives the first signature verification key from the device via the message, and wherein, prior to the message being received at the initial subscription manager, the device authenticates the message by protecting the message using first provisioning data;

return, to the device, an acknowledgement that the first signature verification key has been received, the acknowledgement comprising a signed version of the first signature verification key;

authenticate the message using data corresponding to the provisioning data;

receive, from a subscription manager, a second signature verification key that is configured to enable the subscription manager to be subsequently authenticated with the device; and subsequent to authenticating the message using the data corresponding to the provisioning data, provide the second signature verification key to the device, wherein the second signature verification key, which was received by the initial subscription manager from the subscription manager and which was sent by the initial subscription manager to the device, is configured to enable the device to authenticate the subscription manager such that the initial subscription manager acts as an initial intermediary between the device and the subscription manager.

\* \* \* \* \*